(12) United States Patent
Bae et al.

(10) Patent No.: US 12,057,062 B2
(45) Date of Patent: Aug. 6, 2024

(54) ELECTRONIC DEVICE INCLUDING AN IN-DISPLAY OPTICAL SENSOR

(71) Applicant: SAMSUNG ELECTRONICS CO., LTD., Suwon-si (KR)

(72) Inventors: Jungbae Bae, Suwon-si (KR); Jinhyun Kim, Suwon-si (KR); Jongkon Bae, Suwon-si (KR); Dongseop Lee, Suwon-si (KR); Kwangtai Kim, Suwon-si (KR); Donghyun Yeom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/094,579

(22) Filed: Jan. 9, 2023

(65) Prior Publication Data

US 2023/0186844 A1    Jun. 15, 2023

Related U.S. Application Data

(63) Continuation of application No. PCT/KR2022/010864, filed on Jul. 25, 2022.

(30) Foreign Application Priority Data

Jul. 29, 2021  (KR) .................. 10-2021-0099990
Nov. 1, 2021   (KR) .................. 10-2021-0147969

(51) Int. Cl.
*G09G 3/3208* (2016.01)
*G06V 10/60* (2022.01)

(52) U.S. Cl.
CPC .......... *G09G 3/3208* (2013.01); *G06V 10/60* (2022.01); *G09G 2320/0233* (2013.01); *G09G 2320/0271* (2013.01); *G09G 2320/0686* (2013.01)

(58) Field of Classification Search
CPC .................................. G09G 3/3208
See application file for complete search history.

(56) References Cited

U.S. PATENT DOCUMENTS 9,967,444 B2   5/2018   Choi et al.
10,733,931 B2  8/2020   Jung et al.
(Continued)

FOREIGN PATENT DOCUMENTS

JP    2009-177244    8/2009
JP    2021-076865    5/2021
(Continued)

OTHER PUBLICATIONS

Park et al. Pub. No. KR 2020-0060118 A Machine Translation (Year: 2023).*

(Continued)

*Primary Examiner* — Gustavo Polo
(74) *Attorney, Agent, or Firm* — NIXON & VANDERHYE P.C.

(57) ABSTRACT

According to various embodiments of the disclosure, an electronic device may include: a camera sensor, a display panel including a first area corresponding to an area in which the camera sensor is disposed, and a second area different from the first area, and a display driver IC (DDI) configured to drive the display panel, wherein the DDI is configured to: obtain at least one of a luminance value or a gradation value of a first image output to the first area, determine whether to control the first image output to the first area, based on at least one of the luminance value or the gradation value of the first image, and control the first image output to the first area in response to the determination, wherein the first image is controlled such that, based on at least one of the luminance value of the first image or the gradation value of the first image, a plurality of pixels disposed in the first area are (Continued)

powered off, or a third image different from the first image is output to the first area.

20 Claims, 10 Drawing Sheets

(56) References Cited

U.S. PATENT DOCUMENTS

| | | |
|---|---|---|
| 10,838,468 B2 | 11/2020 | Bikumala et al. |
| 10,877,308 B2 | 12/2020 | Kim et al. |
| 11,138,927 B2 | 10/2021 | Jung et al. |
| 11,153,520 B2 | 10/2021 | Park et al. |
| 11,508,339 B2 | 11/2022 | Jeong et al. |
| 2014/0111417 A1 | 4/2014 | Son |
| 2020/0409163 A1 | 12/2020 | Zhu et al. |
| 2021/0043695 A1 | 2/2021 | Wang et al. |
| 2021/0084236 A1 | 3/2021 | Han |
| 2021/0167163 A1 | 6/2021 | Jeong et al. |
| 2022/0319467 A1 | 10/2022 | Xiang |

FOREIGN PATENT DOCUMENTS

| | | |
|---|---|---|
| KR | 10-2015-0091595 | 8/2015 |
| KR | 10-2016-0019184 | 2/2016 |
| KR | 10-2017-0113066 | 10/2017 |
| KR | 10-2020-0060118 | 5/2020 |
| KR | 10-2020-0075547 | 6/2020 |
| KR | 10-2020-0087398 | 7/2020 |
| KR | 10-2021-0069289 | 6/2021 |
| WO | 2021/129571 | 7/2021 |

OTHER PUBLICATIONS

International Search Report for PCT/KR2022/010864, mailed Nov. 3, 2022, 6 pages.
Written Opinion of the ISA for PCT/KR2022/010864, mailed Nov. 3, 2022, 4 pages.

* cited by examiner

ELECTRONIC DEVICE INCLUDING AN IN-DISPLAY OPTICAL SENSOR

CROSS-REFERENCE TO RELATED APPLICATIONS

This application is a continuation of International Application No. PCT/KR2022/010864 designating the United States, filed on Jul. 25, 2022, in the Korean Intellectual Property Receiving Office and claiming priority to Korean Patent Application No. 10-2021-0099990, filed on Jul. 29, 2021, in the Korean Intellectual Property Office, and to Korean Patent Application No. 10-2021-0147969, filed on Nov. 1, 2021, in the Korean Intellectual Property Office, the disclosures of all of which are incorporated by reference herein in their entireties.

BACKGROUND

Field

The disclosure relates to an electronic device including an in-display optical sensor.

Description of Related Art

Organic light-emitting displays applied to electronic devices do not require separate light sources and thus are advantageous to lightweightness and compactness, and are widely utilized due to the advantages of higher response rates than other displays and excellent light-emitting efficiency, luminance, or field of view. By utilizing organic light-emitting displays, the screen display area on the front side of electronic devices are increasing, and optical sensors conventionally disposed on the front side of electronic devices are disposed on the periphery or back side of the display to be adjacent to the display.

When an under display camera (UDC) is applied to an electronic device, multiple pixels and a driving circuitry may be partially removed from the display area corresponding to disposition of the UDC so as to secure a light-transmitting area for the UDC. In this case, the pixel density of the display area corresponding to disposition of the UDC is smaller than the pixel density of other display areas, and the resolution of the display area corresponding to disposition of the UDC may thus be degraded.

Therefore, when data is output through the display, the visibility of the display area corresponding to disposition of the UDC may become noticeable according to the luminance value or gradation value of the data, thereby degrading the immersive experience of the user who watches the screen of the electronic device.

SUMMARY

An electronic device according to various example embodiments of the disclosure may include: a camera sensor, a display panel including a first area corresponding to an area in which the camera sensor is disposed, and a second area different from the first area, and a display driver IC (DDI) configured to drive the display panel, wherein the DDI is configured to: obtain at least one of a luminance value or a gradation value of a first image output to the first area, determine whether to control the first image output to the first area based on at least one of the luminance value or the gradation value of the first image, and control the first image output to the first area in response to the determination, wherein the first image is controlled such that, based on at least one of the luminance value of the first image or the gradation value of the first image, a plurality of pixels disposed in the first area are powered off, or a third image different from the first image is output to the first area.

A method of controlling an electronic device including a display panel including a first area corresponding to an area in which a camera sensor is disposed and a second area different from the first area according to various example embodiments of the disclosure may include: obtaining at least one of a luminance value of a first image output to the first area or a gradation value of the first image, determining whether to control the first image output to the first area based on at least one of the luminance value of the first image or the gradation value of the first image, and controlling the first image output to the first area in response to the determination, wherein the first image is controlled such that, based on at least one of the luminance value of the first image or the gradation value of the first image, a plurality of pixels disposed in the first area are powered off, or a third image different from the first image is output to the first area.

An electronic device according to various example embodiments of the disclosure may include: a camera sensor, a display panel including a first area corresponding to an area in which the camera sensor is disposed, and a second area different from the first area, a display driver IC (DDI) configured to drive the display panel, and a processor electrically connected to the camera sensor, the display panel, and the display driver IC, wherein the processor is configured to: obtain at least one of a luminance value of a first image output to the first area and a gradation value of the first image through the DDI, determine whether to control the first image output to the first area based on at least one of the luminance value of the first image and the gradation value of the first image, and control the first image output to the first area through the DDI in response to the determination, wherein the first image is controlled such that, based on at least one of the luminance value of the first image or the gradation value of the first image, a plurality of pixels disposed in the first area are powered off, or a third image different from the first image is output to the first area.

According to various example embodiments of the disclosure, when data is output through a display of an electronic device, the display area corresponding to disposition of an under display camera may be prevented and/or reduced from noticeably visible, thereby enhancing the user's immersive experience.

Various other advantages effects identified explicitly or implicitly through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure are described in greater detail with reference to the accompanying drawings. However, this is not intended to limit the disclosure to specific embodiments, and should be understood to include various modifications, equivalents, or alternatives to embodiments of the disclosure.

Figure 1:
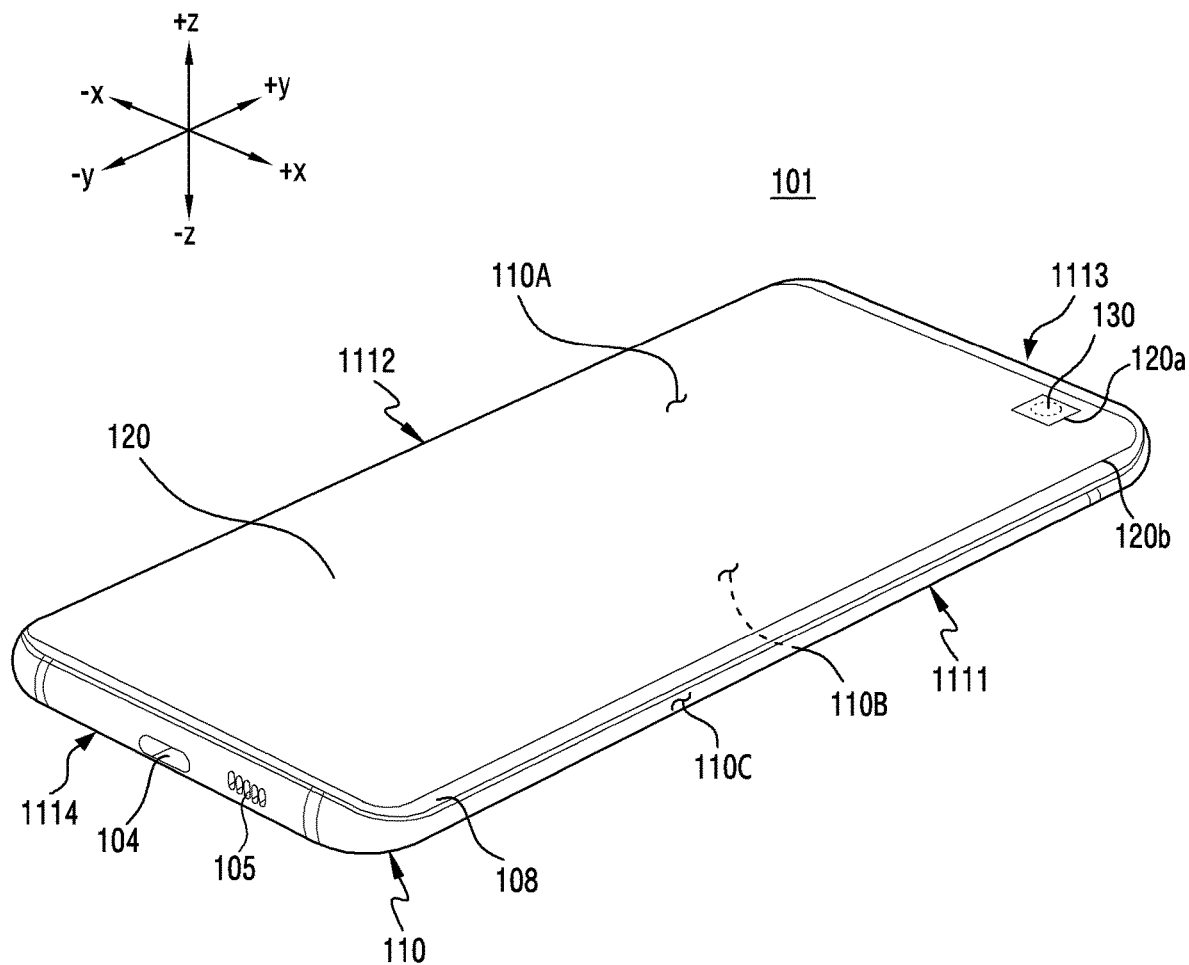
FIG. 1 is a front perspective view of an electronic device, according to various embodiments.

FIG. 1 is a front perspective view of an electronic device 101, according to various embodiments.

The electronic device 101 of FIG. 1 may correspond to an electronic device 1001 of FIG. 10 to be described in greater detail below. For example, the electronic device 101 may include some or all of the components configuring the electronic device 1001 of FIG. 10.

Referring to FIG. 1, the electronic device 101 according to various embodiments of the disclosure is illustrated by way of non-limiting example as a bar-type electronic device, but may be implemented as an electronic device such as a slidable, rollable, or foldable type electronic device.

In an embodiment, the electronic device 101 may include a display device. For example, the electronic device 101 may include an organic light-emitting display device.

Referring to FIG. 1, the electronic device 101 according various embodiments of the disclosure may include a housing 110 including a first surface (or a front surface) 110A, a second surface (or a rear surface) 110B, and a side surface (or a side wall) 110C surrounding the space between the first surface 110A and the second surface 110B. In an embodiment, the housing 110 may refer to a structure configuring a part of the first surface 110A, the second surface 110B, and the side surface 110C of FIG. 1.

According to an embodiment, at least a part of the first surface 110A may be configured by a substantially transparent front plate 108 (e.g., a glass plate or a polymer plate including various coating layers). In an example, the front plate 108 may include a curved portion, which is bent and seamlessly extends from the first surface 110A toward a rear plate (not shown), at at least one side edge portion thereof.

In an embodiment, the second surface 110B may be configured by a substantially opaque rear plate (not shown). The rear plate may be formed of coated or colored glass, a ceramic, a polymer, a metal (e.g., aluminum, stainless steel (STS), or magnesium), or a combination of at least two of the above materials. In an example, the rear plate may include a curved portion, which is bent and seamlessly extends from the second surface 110B toward the front plate 108, at at least one side edge portion thereof.

In an embodiment, the side surface 110C may be configured by a side member (or a side bezel structure or side wall) coupled to the front plate 108 and the rear plate (not shown) and including a metal and/or a polymer. In an example, the side surface 110C may include a right first side surface 1111 of the electronic device 101, a second side surface 1112 substantially parallel to the first side surface 1111 and extending in a first direction (e.g., the +y direction in FIG. 1), a third side surface 1113 extending in a second direction (e.g., the +x direction in FIG. 1) substantially perpendicular to the first direction and connecting one end (e.g., one end in the +y direction in FIG. 1) of the first side surface 1111 and one end (e.g., one end in the +y direction in FIG. 1) of the second side surface 1112, and/or a fourth side surface 1114 substantially parallel to the third side surface 1113 and connecting the other end (e.g., one end in the −y direction in FIG. 1) of the first side surface 1111 and the other end (e.g., one end in the −y direction in FIG. 1) of the second side surface 1112.

In an embodiment, the electronic device 101 may include a camera sensor 130. In an example, the camera sensor 130 may be disposed in an area overlapping at least one area of a display 120. In an example, the camera sensor 130 may be disposed on a rear surface (e.g., the −z direction in FIG. 1) of the display 120.

In an embodiment, the camera sensor 130 may be replaced with various optical sensors such as a fingerprint recognition sensor for fingerprint recognition or an illuminance sensor.

In an embodiment, the electronic device 101 may include the display 120. In an example, the display 120 may be visually exposed (e.g., visible) through a substantial part of the front plate 108. In an example, the display 120 may be coupled to or disposed adjacent to a touch sensing circuit, a pressure sensor capable of measuring the intensity (pressure) of a touch, and/or a digitizer which detects a magnetic field-type stylus pen. In an example, the edges of the display 120 may be configured to be substantially the same as the outer contour shape (e.g., a curved surface) of the front plate 108 adjacent thereto.

In an embodiment, the display 120 may include an organic LED (OLED) or an active-matrix organic LED (AMOLED). In an example, the display 120 may include an organic light-emitting display panel.

In an embodiment, the display 120 may include a plurality of pixels PX. Each of the plurality of pixels PX may include at least one light-emitting element. The display 120 may output a video by driving the plurality of pixels PX in response to video data input from the outside.

In an embodiment, the electronic device 101 may include a touch sensor panel (TSP) disposed on the display 120 so as to more intuitively control a user interface output through the display 120. The touch sensor panel may touch the display 120 or detect a position of an object (e.g., a user's finger or a stylus pen) hovered over the display 120 using at least one of a resistive film, capacitive components, surface acoustic waves, and infrared rays. In an example, the display 120 may include a control circuit including a touch display driver IC (TDDI) when operating as an in-cell type or on-cell type touch display according to an arrangement position of the touch sensor panel.

In an embodiment, the display 120 may include a first area (e.g., a first area 1211 of FIG. 2) corresponding to an area in which the camera sensor 130 is disposed. The first area 1211 may include an area in which a plurality of pixels are disposed.

In an embodiment, the display 120 may include a second area (e.g., a second area 1212 of FIG. 2) distinguished from the first area 1211. In an example, the second area 1212 may include a peripheral area of the first area 1211. In an embodiment, the second area 1212 may include an area in which a driving circuit is disposed.

In an embodiment, the display 120 may output various contents (e.g., an image, a video, text, or an icon) through at least one of the first area 1211 and the second area 1212. The first area 1211 and the second area 1212 may include a plurality of pixels for outputting content.

In an embodiment, the number of pixels per unit area of the first area 1211 corresponding to the area in which the camera sensor 130 is disposed may be less than the number of pixels per unit area of the second area 1212 in order to increase the transmittance of the camera sensor 130 disposed under the first area 1211.

In an embodiment, a connector hole 104 may receive a connector for transmitting or receiving power and/or data to or from an external electronic device (e.g., electronic devices 1002 and 1004 of FIG. 10) and/or a connector for transmitting or receiving an audio signal to or from the external electronic device. For example, the connector hole 104 may include a USB connector or an earphone jack (or "earphone interface"). In an example, the USB connector and the earphone jack may be implemented as a single hole. In an embodiment, the electronic device 101 may transmit or receive power and/or data or transmit or receive an audio signal to or from an external device without a separate connector hole.

In an embodiment, an audio module 105 may include a microphone hole and a speaker hole. In the microphone hole, a microphone for acquiring an external sound may be disposed, and a plurality of microphones may be disposed so as to detect the direction of the sound. In another example, the speaker hole and the microphone hole may be implemented as a single hole, or a speaker (e.g., a piezo speaker) may be included without a speaker hole. The speaker hole may include an external speaker hole and a receiver hole for a call.

In an embodiment, the electronic device 101 may include a sensor module which is not shown, so as to generate an electronic signal or a data value corresponding to an internal operating state or an external environmental state. The electronic device 101 may further include at least one of sensor modules not shown, for example, a gesture sensor, a gyro sensor, a barometric pressure sensor, a magnetic sensor, an acceleration sensor, a grip sensor, a color sensor, an infrared (IR) sensor, a temperature sensor, or a humidity sensor.

Figure 2:
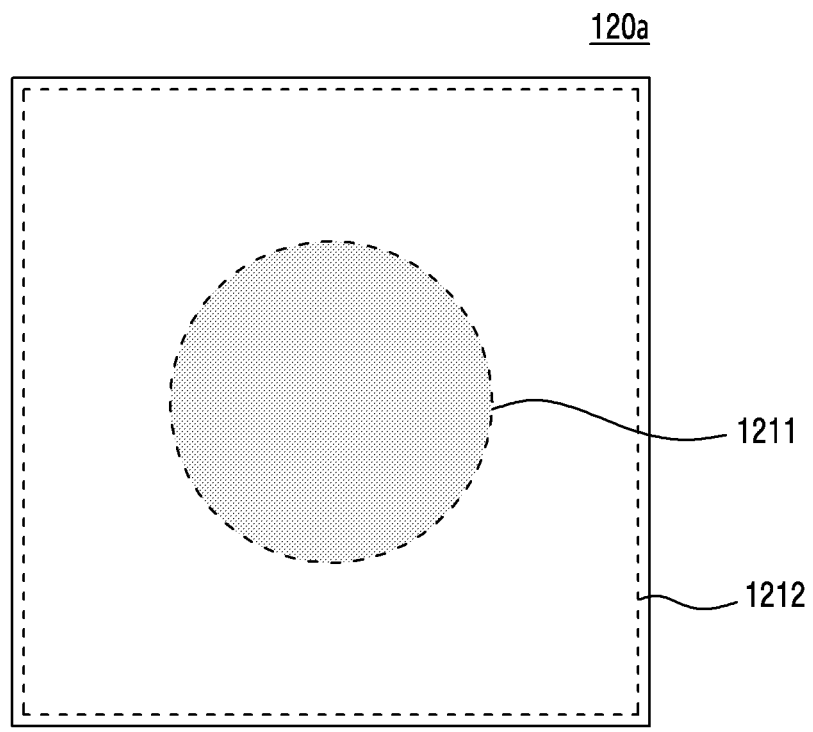
FIG. 2 is a diagram illustrating a first area and a second area of a display, according to various embodiments.

FIG. 2 is a diagram illustrating the first area 1211 and the second area 1212 of a portion of the display, according to an embodiment.

Referring to FIG. 2, a display (e.g., the display 120 of FIG. 1) may include the first area 1211. In an example, the first area 1211 may correspond to an area in which a camera sensor (e.g., the camera sensor 130 of FIG. 1) is disposed.

In an embodiment, the display 120 may include the second area 1212. In an example, the second area 1212 may include a peripheral area of the first area 1211. The second area 1212 may include an area spaced a predetermined distance apart from the first area 1211.

In an embodiment, in order to increase the transmittance of the camera sensor 130, the number of pixels per unit area, disposed in the first area 1211, may be less than the number of pixels per unit area, disposed in the second area 1212.

Figure 3:
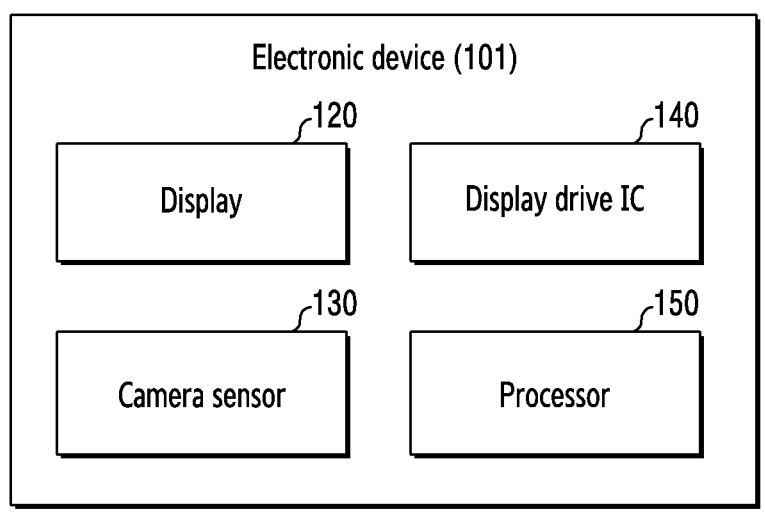
FIG. 3 is a block diagram illustrating an example configuration of an electronic device, according to various embodiments.

FIG. 3 is a block diagram illustrating an example configuration of the electronic device 101, according to various embodiments.

Referring to FIG. 3, the electronic device 101 may include the display 120, the camera sensor 130, and a display driver IC (DDI) 140.

In an embodiment, the electronic device 101 may be implemented without some components or may be implemented to further include components not shown. For example, the electronic device 101 may further include a memory and/or a processor (e.g., including processing circuitry) 150.

In an embodiment, the display 120 may output video data through the display driver IC 140. In an embodiment, the display 120 may include an organic LED (OLED) display or an active-matrix organic LED (AMOLED) display.

In an embodiment, the display driver IC 140 may be electrically connected to the display 120, the camera sensor 130, and the processor 150.

In an embodiment, the display driver IC 140 may convert data received from the processor 150 into a form which can be transmitted to the display 120, and transmit the converted data (or display data) to the display 120. In an example, the converted data may be transmitted in units of pixels PX.

In an embodiment, the display driver IC 140 may obtain at least one of a color, an on-pixel ratio (OPR), a color on pixel ratio (COPR), a luminance (brightness) value, or a gradation value of a video being output through the display 120. In an example, the OPR represents a ratio of on-pixels in a plurality of pixels included in the display 120. The COPR represents a ratio of on-pixels to red (R), green (G), and blue (B) in the plurality of pixels included in the display 120.

In an embodiment, the display driver IC 140 may obtain at least one of a luminance value or a gradation value of an image (or a video) output to the display 120 through a video signal displayed through each of the plurality of pixels included in the display 120.

In the disclosure, the luminance may refer, for example, to the degree of brightness. The gradation may refer, for example, to subdividing light and dark parts into multiple stages according to a change in color density.

In an example, the display driver IC 140 may obtain a luminance value of an image output to the first area 1211 through a video signal displayed through each of a plurality of pixels included in the first area 1211 of the display 120. In an example, the display driver IC 140 may obtain a luminance value of an image output to the second area 1212 through a video signal displayed through each of a plurality of pixels included in the second area 1212 of the display 120.

In an example, the display driver IC 140 may obtain a gradation value of an image output to the first area 1211 through a video signal displayed through each of the plurality of pixels included in the first area 1211 of the display 120. In an example, the display driver IC 140 may obtain a gradation value of an image output to the second area 1212 through a video signal displayed through each of the plurality of pixels included in the second area 1212 of the display 120.

In an example, the display driver IC 140 may determine whether to control a video output through the first area 1211, based on at least one of a luminance value or a gradation value obtained through a video signal displayed through each of the plurality of pixels included in the first area 1211.

In an embodiment, the processor 150 may be electrically or operatively connected to the display 120, the camera sensor 130, and the display driver IC 140.

In an embodiment, the processor 150 may include various processing circuitry and obtain at least one of a luminance value or a gradation value of the first area 1211 through the display driver IC 140.

In an embodiment, the processor 150 may determine whether to control an image output through the first area 1211, based on at least one of the luminance value or the gradation value of the first area 1211 obtained through the display driver IC 140.

In an embodiment, the processor 150 may transmit, to the display driver IC 140, a control signal for the determined image output through the first area 1211.

In an embodiment, the display driver IC 140 may control and output an image output to the first area 1211, based on the control signal for the image output through the first area 1211 received from the processor 150.

In an embodiment, control of a video output through the first area 1211 may include control to power off the plurality of pixels included in the first area 1211, or control to output another image distinguished from the image output through the first area 1211.

In an embodiment, control of a video output through the first area 1211 may include at least one of control to output an all-black image to the first area 1211 or control to output an image configured according to a user input. In an example, the processor 150 may control a video output through the second area 1212 adjacent to the first area 1211, based on the control of the video output through the first area 1211. For example, the processor 150 may output an all-black image to the first area 1211, and control and output at least one of a luminance value, a gradation value, or a color of an image output to the second area 1212, based on the outputting of the all-black image to the first area 1211. The control of at least one of the luminance value, the gradation value, or the color of the image output to the second area 1212 may include control to change at least one of the luminance value, the gradation value, or the color of the image output to the second area 1212 in order to process gradation between the image output to the first area 1211 and the image output to the second area 1212.

In an embodiment, the processor 150 may execute an operation or data related to control and/or communication of at least one other component of the electronic device 101 using instructions stored in a memory (not shown). In an example, the processor 150 may include at least one of a central processing unit (CPU), a graphic processing unit (GPU), a micro controller unit (MCU), a sensor hub, a supplementary processor, a communication processor, an application processor, an application specific integrated circuit (ASIC), and field programmable gate arrays (FPGAs), and have a plurality of cores.

Figure 4:
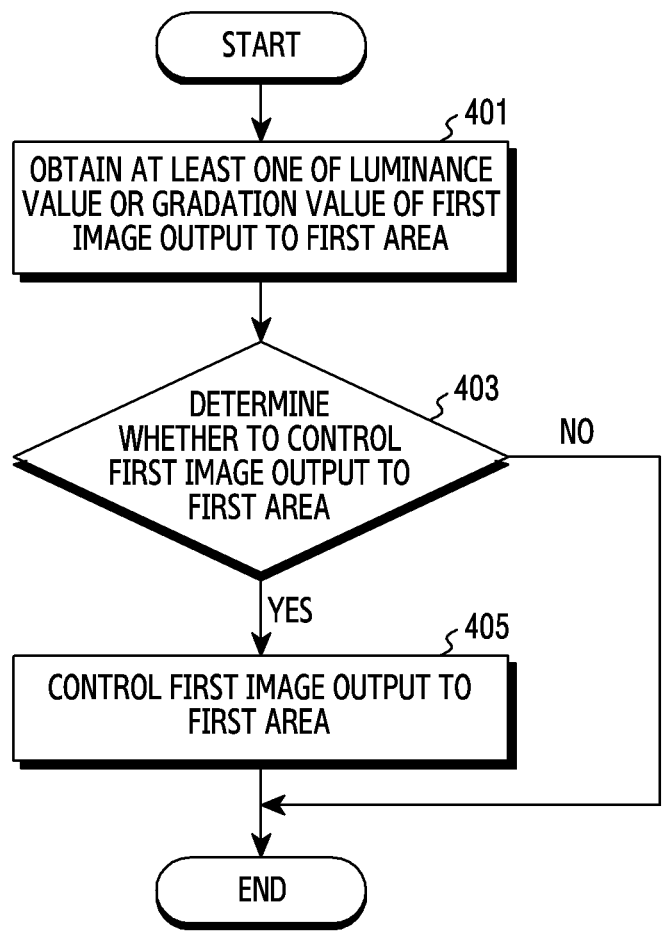
FIG. 4 is a flowchart illustrating an example method of controlling an image output to a first area of a display, according to various embodiments.

FIG. 4 is a flowchart illustrating an example method of controlling an image output to the first area 1211 of the display 120, according to various embodiments.

Hereinafter, in an embodiment, each of operations may be sequentially performed, but is not necessarily performed sequentially. For example, a sequence of each operation may be changed, and at least two operations may be performed in parallel.

According to an embodiment, in operation 401, the electronic device 101 may obtain at least one of a luminance value or a gradation value of a first image output to the first area 1211. For example, the display driver IC 140 may obtain at least one of the luminance value or the gradation value of the first image output to the first area 1211 of the display 120.

In an embodiment, the display driver IC 140 may obtain at least one of a luminance value or a gradation value of a first image being output to or to be output to the first area 1211 of the display 120.

In an example, the first image output to the first area 1211 may include at least a part of images output to the display 120 by execution of an application and/or a user input.

In an example, the display driver IC 140 may obtain at least one of the luminance value or the gradation value of the first image output to the first area 1211, based on a video signal displayed through each of a plurality of pixels included in the first area 1211 corresponding to an area in which the camera sensor 130 is disposed.

In an embodiment, the display driver IC 140 may calculate an average value of luminance values for each of the plurality of pixels included in the first area 1211, so as to determine the luminance value of the first image output to the first area 1211.

In an embodiment, the display driver IC 140 may calculate an average value of gradation values for each of the plurality of pixels included in the first area 1211, so as to determine the gradation value of the first image output to the first area 1211.

According to an embodiment, in operation 403, the electronic device 101 may determine whether to control the first image output to the first area 1211, based on the luminance value or the gradation value of the first image output to the first area 1211. For example, the display driver IC 140 may determine whether to control the first image output to the first area 1211, based on at least one of the obtained luminance value or gradation value of the first area 1211.

In an embodiment, the processor 150 may determine whether to control a first image output to the first area 1211, based on at least one of a luminance value or a gradation value of the first area 1211 obtained through the display driver IC 140. In this regard, the display driver IC 140 may transmit, to the processor 150, at least one of a luminance value or a gradation value of the first image output to the first area 1211. In an embodiment, the processor 150 may receive, from the display driver IC 140, at least one of the luminance value or the gradation value of the first image output to the first area 1211.

In an embodiment, the processor 150 may determine whether to control a first image output to the first area 1211, based on at least one of a luminance value or a gradation value of the first image output to the first area 1211.

In an embodiment, an operation of determining whether to control a first image output to the first area 1211, based on a luminance value of the first area 1211, will be described in greater detail below with reference to FIG. 5.

In an embodiment, an operation of determining whether to control a first image output to the first area 1211, based on a gradation value of the first area 1211, will be described in greater detail below with reference to FIG. 6.

In an embodiment, when a luminance value of the first area 1211 is equal to or greater than a configured value, the display driver IC 140 may determine to control a first image output to the first area 1211.

In an embodiment, the display driver IC 140 may determine to control a first image output to the first area 1211, when a gradation value of the first area 1211 is included in a high gradation section or a low gradation section.

In an embodiment, the display driver IC 140 may determine to control a first image output to the first area 1211, when a luminance value of the first area 1211 is equal to or greater than a configured value and a gradation value of the first area 1211 is included in the low gradation section.

In an embodiment, the display driver IC 140 may determine control of a first image output to the first area 1211, based on a difference between a gradation value of a video output to the first area 1211 and a gradation value of a video output to the second area 1212.

According to an embodiment, in operation 405, the electronic device 101 may control an image output to the first area 1211.

For example, when it is determined that the display driver IC 140 controls a first image output to the first area 1211, the display driver IC 140 may control the first image output to the first area 1211.

In an embodiment, when it is determined that the processor 150 controls a first image output to the first area 1211, the processor 150 may transmit, to the display driver IC 140, a control signal for the first image output to the first area 1211.

In an embodiment, the display driver IC 140 may receive a control signal for the first image output to the first area 1211.

In an embodiment, the display driver IC 140 may control the first image output to the first area 1211, when the control signal for the first image output to the first area 1211 is received from the processor 150.

In an embodiment, the first image output to the first area 1211 may be controlled such that the plurality of pixels disposed in the first area 1211 are powered off or a third image distinguished from the first image output to the first area is output.

In an embodiment, the third image distinguished from the first image may include at least one of an all-black image for indicating the camera sensor 130 or an image configured according to a user input.

In an embodiment, when the first image output to the first area 1211 is controlled such that the third image distinguished from the first image output to the first area 1211 is output, the display driver IC 140 may synthesize the third image with the first image output to the first area 1211, so as to output the synthesized image through the display 120.

In an embodiment, operations 401 to 405 may be performed through the processor 150 distinguished from the display driver IC 140.

Figure 5:
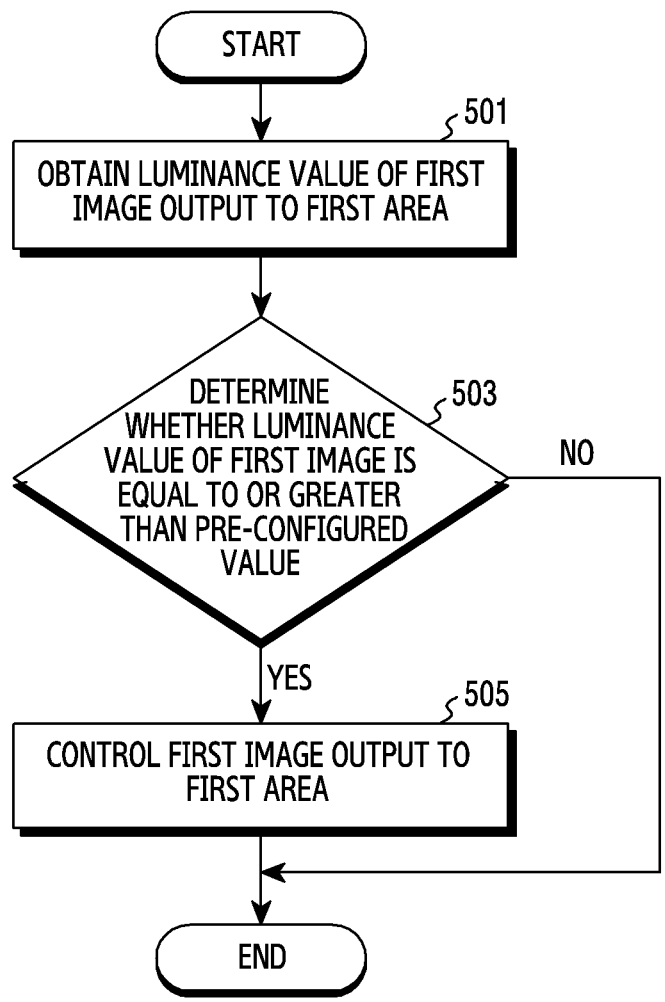
FIG. 5 is a flowchart illustrating an example method of controlling an image output to a first area of a display, according to various embodiments.

FIG. 5 is a flowchart illustrating an example method of controlling an image output to the first area 1211 of the display 120, according to various embodiments.

According to an embodiment, in operation 501, the electronic device 101 may obtain a luminance value of a first image output to the first area 1211 of the display 120. For example, the display driver IC 140 may obtain a luminance value of a first image output to the first area 1211 through a video signal displayed through each of a plurality of pixels included in the first area 1211. For another example, the display driver IC 140 may obtain a luminance value of a first image to be output to the first area 1211 through a signal for a video to be displayed through each of the plurality of pixels included in the first area 1211.

According to an embodiment, in operation 503, the electronic device 101 (e.g., the display driver IC 140 of FIG. 3) may determine whether the obtained luminance value of the first image output to the first area 1211 is equal to or greater than a pre-configured (e.g., specified) value. In an example, the pre-configured value may be determined by a user input. In another example, the pre-configured value may be a maximum brightness level controllable by a user input. In another example, the pre-configured value may include a configured value pre-stored in a memory of the electronic device 101.

In an embodiment, video data output through the display 120 may have a range of brightness, which is divided into a high brightness section and a low brightness section. The low brightness section may refer to a section between a minimum brightness level controllable by a user's input and a maximum brightness level controllable by the user's input. The high brightness section may refer to a section between a maximum brightness section level controllable by the user's input and a maximum brightness level controllable by the display driver IC 140. In an example, the maximum brightness level controllable by a user input may include about 500 nits. The maximum brightness level controllable by the display driver IC 140 may be about 900 nits.

In an embodiment, the display driver IC 140 may determine whether a luminance value of a first image output to the first area 1211 is equal to or greater than a maximum brightness level controllable by a user's input.

In an embodiment, the display driver IC 140 may determine to control the first image output to the first area 1211, when the luminance value of the first image output to the first area 1211 is equal to or greater than the maximum brightness level controllable by the user's input.

In an embodiment, when the luminance value of the first image output to the first area 1211 is equal to or greater than the maximum brightness level controllable by the user's input, since visibility may be relatively noticeable when the first area 1211 corresponding to an area in which the camera sensor 130 is disposed is compared with an area (e.g., the second area 1212) of the display 120 other than the first area 1211, the display driver IC may determine to control the first image output to the first area 1211.

In an embodiment, the display driver IC 140 may output the first image through the first area 1211, when the luminance value of the first image output to the first area 1211 is less than the maximum brightness level controllable by a user input. Since visibility may not be relatively noticeable when the first area 1211 corresponding to the area in which the camera sensor 130 is disposed is compared with the area (e.g., the second area 1212) of the display 120 other than the first area 1211, the first image may be output to the first area 1211.

According to an embodiment, in operation 505, the electronic device 101 may control the first image output to the first area 1211, when the luminance value of the first image output to the first area 1211 is equal to or greater than the pre-configured value.

For example, when a luminance value of a first image output to the first area 1211 is greater than or equal to a pre-configured value, the display driver IC 140 may control to power off the plurality of pixels disposed in the first area 1211, or output a third image distinguished from the first image to the first area 1211.

In an embodiment, when a luminance value of a first image to be output to the first area 1211 is greater than or equal to a pre-configured value, the display driver IC 140 may output a third image distinguished from the first image to the first area 1211. In an example, the display driver IC 140 may output an all-black image through the first area 1211 when a luminance value of a first image to be output to the first area 1211 is equal to or greater than a maximum brightness level controllable by a user input.

In an embodiment, the display driver IC 140 may output a gray image through the first area 1211, when a luminance value of a first image to be output to the first area 1211 is changed from a maximum brightness level controllable by a user's input to be less than the maximum brightness level controllable by the user's input.

Figure 6:
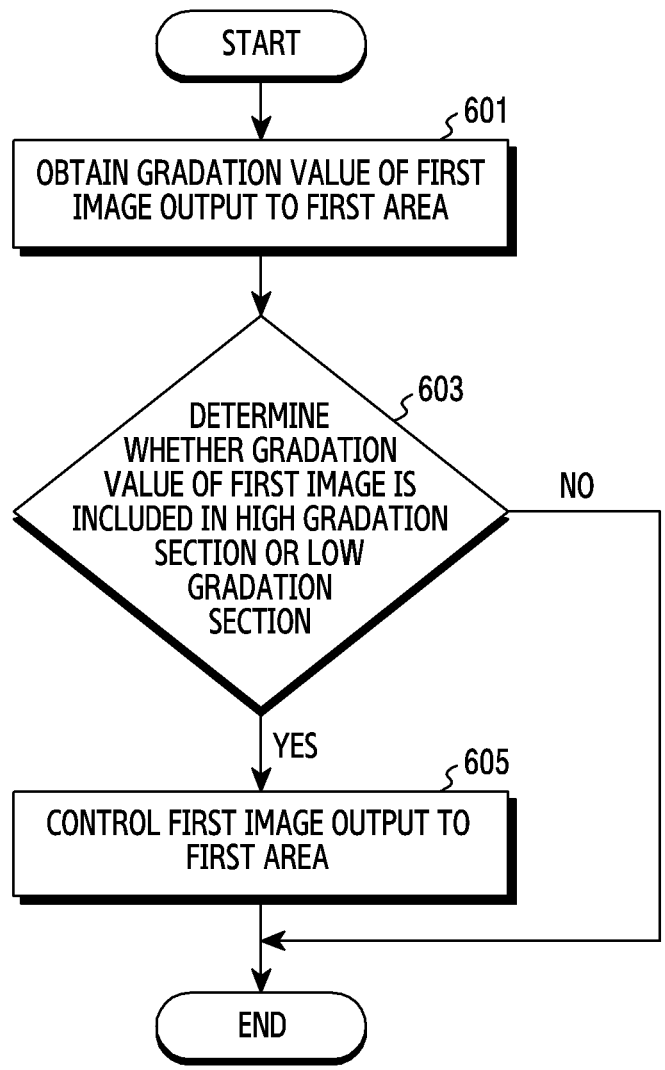
FIG. 6 is a flowchart illustrating an example method of controlling an image output to a first area of a display, according to various embodiments.

FIG. 6 is a flowchart illustrating an example method of controlling an image output to the first area 1211 of the display 120, according to various embodiments.

According to an embodiment, in operation 601, the electronic device 101 may obtain a gradation value of a first image output to the first area 1211. For example, the display driver IC 140 may obtain a gradation value of a first image output to the first area 1211 through a video signal displayed through each of a plurality of pixels included in the first area 1211.

For another example, the display driver IC 140 may obtain a gradation value of a first image to be output to the first area 1211 through a signal for a video to be displayed through each of the plurality of pixels included in the first area 1211.

In an embodiment, video data output through the display 120 may have a range of gradation, which is divided into a high gradation section, a low gradation section, and an intermediate gradation section belonging between the high gradation section and the low gradation section. For example, when the range of gradation has 0 to 255 gradation values (when an image has 256 stage gradations for each color signal of red (R), green (G), and blue (B)), the high gradation section may include a gradation section of 242 to 255 stages, the low gradation section may include a gradation section of 32 stages or less, and the intermediate gradation section may include a gradation section of 32 to 242 stages. In an example, the high gradation section, the low gradation section, and the intermediate gradation section may be determined by a user input according to a range of gradation configured in the electronic device 101.

In an embodiment, the gradation value of the first image output to the first area 1211 may be included in one of the high gradation section, the low gradation section, and the intermediate gradation section.

According to an embodiment, in operation 603, the electronic device 101 (e.g., the display driver IC 140) may determine whether the gradation value of the first image is included in the high gradation section or the low gradation section.

According to an embodiment, in operation 605, when the gradation value of the first image is included in the high gradation section or the low gradation section, the electronic device 101 (e.g., the display driver IC 140) may control the first image output to the first area 1211.

According to an embodiment, when the gradation value of the first image output to the first area 1211 is included in the high gradation section or the low gradation section, the display driver IC 140 may control to power off the plurality of pixels disposed in the first area 1211, or output a third image distinguished from the first image to the first area 1211.

In an embodiment, when the gradation value of the first image output to the first area 1211 is included in the high gradation section, the display driver IC 140 may control the first image output to the first area 1211 so as to be converted into an all-black image. In an example, the all-black image may correspond to the third image distinguished from the first image.

In an embodiment, when the gradation value of the first image output to the first area 1211 is included in the low gradation section, the display driver IC 140 may control the first image output to the first area 1211 so as to be converted into a gray image. In an example, the gray image may correspond to the third image distinguished from the first image.

Figure 7:
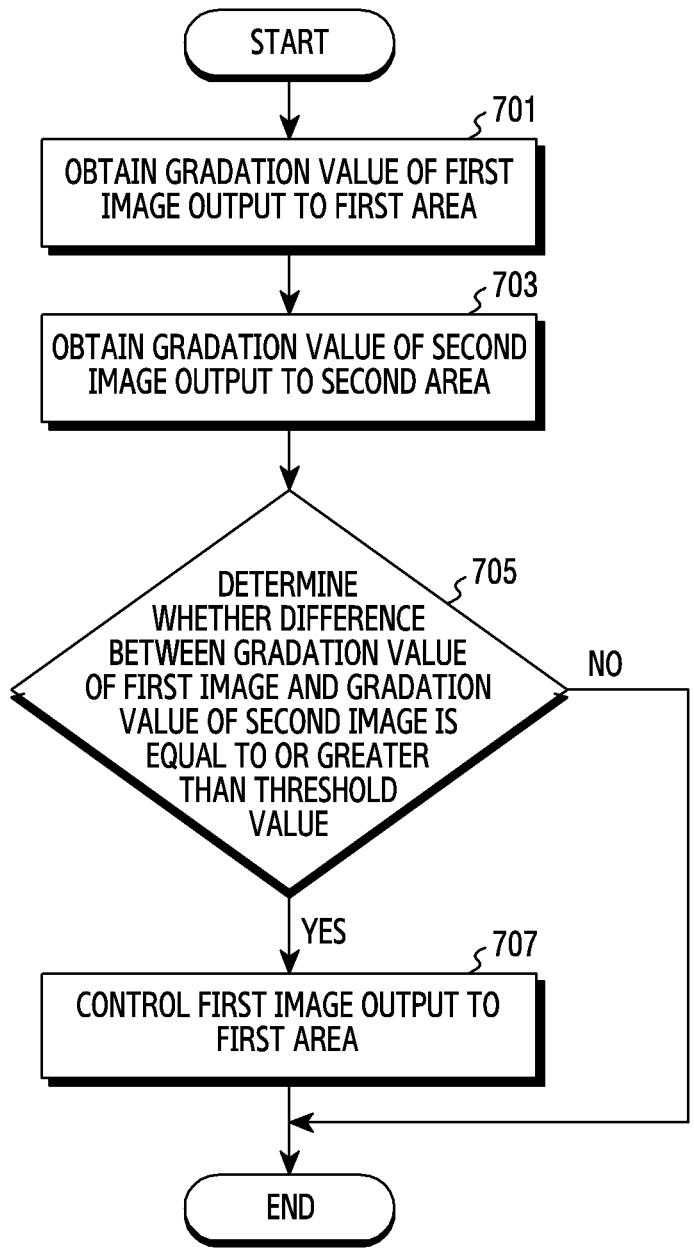
FIG. 7 is a flowchart illustrating an example method of controlling an image output to a first area of a display, according to various embodiments.

FIG. 7 is a flowchart illustrating an example method of controlling an image output to the first area 1211 of the display 120, according to various embodiments.

According to an embodiment, in operation 701, the electronic device 101 may obtain a gradation value of a first image output to the first area 1211. For example, the display driver IC 140 may obtain a gradation value of a first image output to the first area 1211 through a video signal displayed through each of a plurality of pixels included in the first area 1211.

According to an embodiment, in operation 703, the electronic device 101 may obtain a gradation value of a second image output to the second area 1212.

In an embodiment, the second area 1212 may include a peripheral area of the first area 1211. In an example, the second area 1212 may include an area spaced a predetermined distance apart from the first area 1211.

For example, the display driver IC 140 may obtain the gradation value of the second image output to the second area 1212 through a video signal displayed through each of a plurality of pixels included in the second area 1212.

According to an embodiment, in operation 705, the electronic device 101 may determine whether a difference between the gradation value of the first image and the gradation value of the second image is equal to or greater than a threshold value. For example, the display driver IC 140 may determine the difference between the gradation value of the first image output to the first area 1211 and the gradation value of the second image output to the second area 1212.

In an embodiment, the threshold value may be determined by a user input. In another example, the threshold value may include a configured value pre-stored in a memory of the electronic device 101.

According to an embodiment, in operation 707, the electronic device 101 may control the first image output to the first area 1211, when the difference between the gradation value of the first image and the gradation value of the second image is equal to or greater than the threshold value.

For example, when the difference between the gradation value of the first image output to the first area 1211 and the gradation value of the second image output to the second area 1212 is greater than or equal to the threshold value, the display driver IC 140 may control to power off the plurality of pixels disposed in the first area 1211, or output a third image distinguished from the first image to the first area 1211.

In an embodiment, the third image distinguished from the first image may include at least one of an all-black image for indicating the camera sensor 130 or an image configured according to a user's input.

Figure 8A:
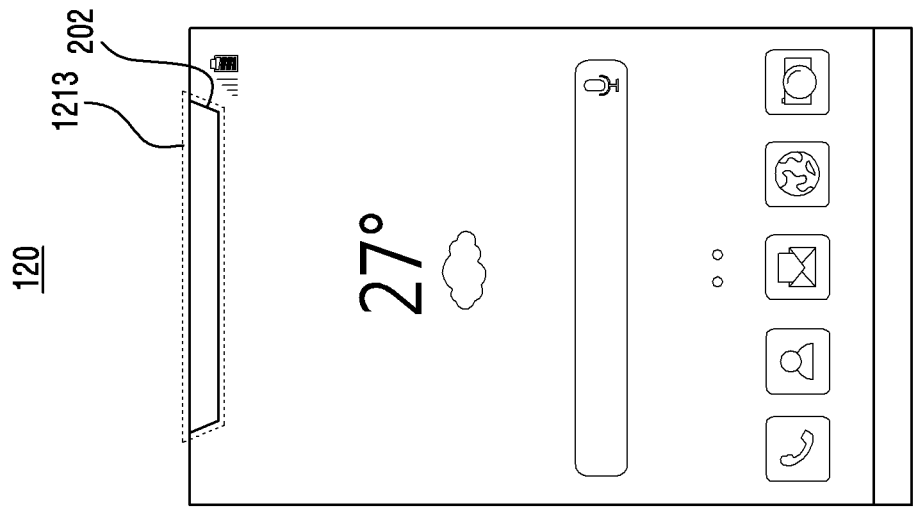
FIGS. 8A, 8B and 8C are diagrams illustrating a display according to control of an image output to a first area of a display, according to various embodiments.
Figure 8B:
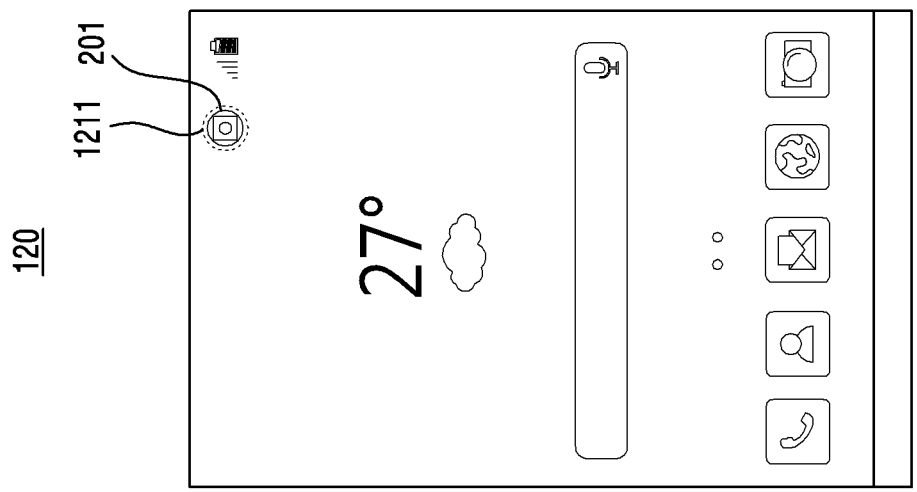
Figure 8C:
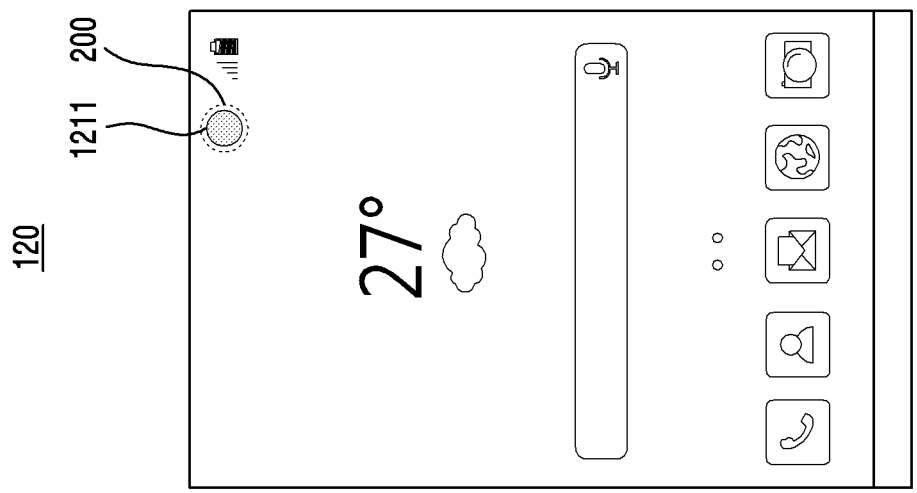

FIGS. 8A, 8B and 8C are diagrams illustrating the display 120 according to control of an image output to the first area 1211 of the display 120, according to various embodiments.

Referring to FIG. 8A, a third image 200 may be output to the first area 1211 according to control of a first image output to the first area 1211 of the display 120. The third image 200 may include an all-black image for indicating the camera sensor 130 disposed under the first area 1211.

Referring to FIG. 8B, a third image 201 may be output to the first area 1211 according to control of a first image output to the first area 1211 of the display 120. The third image 201 may include at least one of images configured according to a user input. For example, the third image 201 may include an image representing the camera sensor 130.

Referring to FIG. 8C, the display driver IC 140 may control an image output to a third area 1213 including the first area 1211, based on at least one of a luminance value and a gradation value of a first image output to the first area 1211. In an example, the third area 1213 may include a notch area including the first area 1211 corresponding to an area in which the camera sensor 130 is disposed, and an area corresponding to a receiver part.

In an embodiment, the display driver IC 140 may control an image output to the third area 1213, based on at least one of the luminance value and the gradation value of the first image output to the first area 1211. The image output to the third area 1213 may be controlled such that a plurality of pixels disposed in the third area 1213 are powered off, or a fourth image 202 distinguished from the first image output to the first area 1211 is output to the third area 1213. In an example, the fourth image 202 may include an all-black image for indicating a notch design.

Figure 9A:
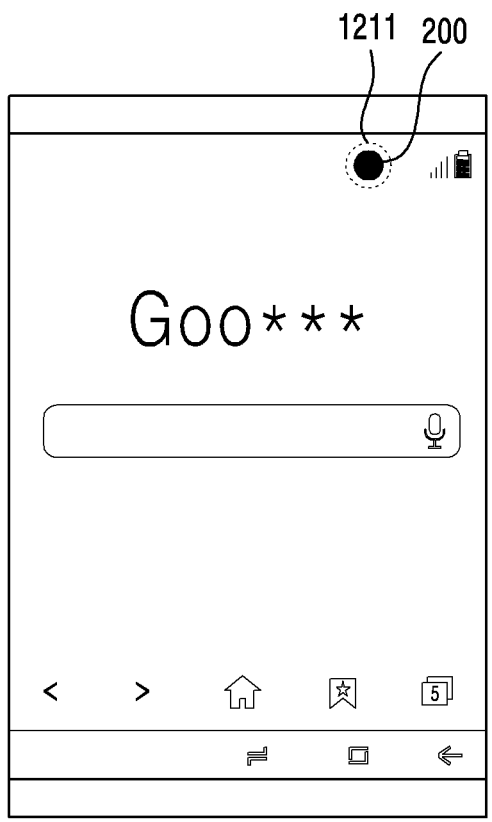
FIGS. 9A and 9B are diagrams illustrating an image output to a first area of a display, according to various embodiments.
Figure 9B:
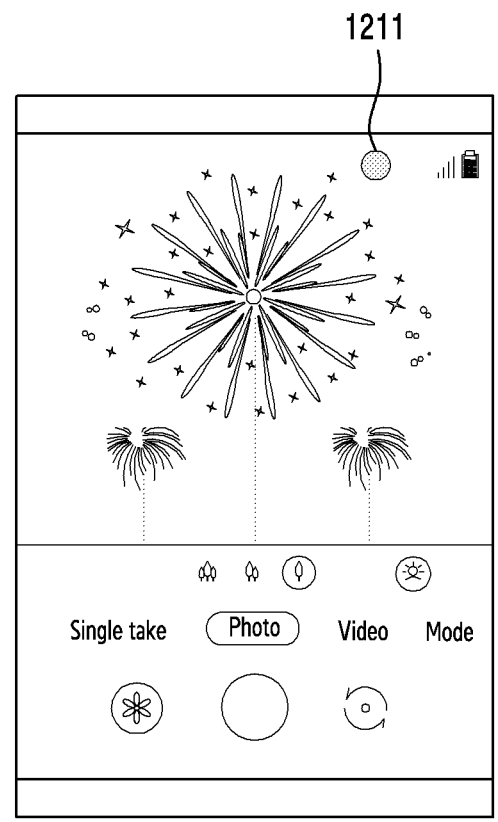

FIGS. 9A and 9B are diagrams illustrating an image output to the first area 1211 of the display 120, according to various embodiments.

Referring to FIG. 9, control of a first image output to the first area 1211 according to the type of application to be executed is shown.

In an embodiment, the processor 150 (or the display driver IC 140) may determine whether to control the first image output to the first area 1211 according to the type of application to be executed.

In an embodiment, the display 120 may output an execution screen for a first application or an execution screen for a second application distinguished from the first application. In an example, the first application may include at least one of an application for executing a front camera, a web browser application, a document writing application, or an e-book application. The second application may include at least one of a video playback application, a gallery application, an application for executing a rear camera, or a game application.

In an embodiment, when the execution screen of the first application is output to the display 120 according to the execution of the first application, the display driver IC 140 may control the first image output to the first area 1211. The first image output to the first area 1211 may be controlled such that a plurality of pixels disposed in the first area 1211 are powered off, or a third image distinguished from the first image output to the first area 1211 is output.

In an embodiment, the processor 150 (or the display driver IC 140) may control to power off the plurality of pixels disposed in the first area 1211, according to the execution of the application for executing the front camera.

Referring to FIG. 9A, when the first application (e.g., a web browser application) is executed, a third image 200 may be output to the first area 1211 according to control of a first image output to the first area 1211.

Referring to FIG. 9B, when the second application (e.g., a camera application) is executed, the display driver IC 140 may output at least a part of the execution screen of the second application to the first area 1211.

Figure 10:
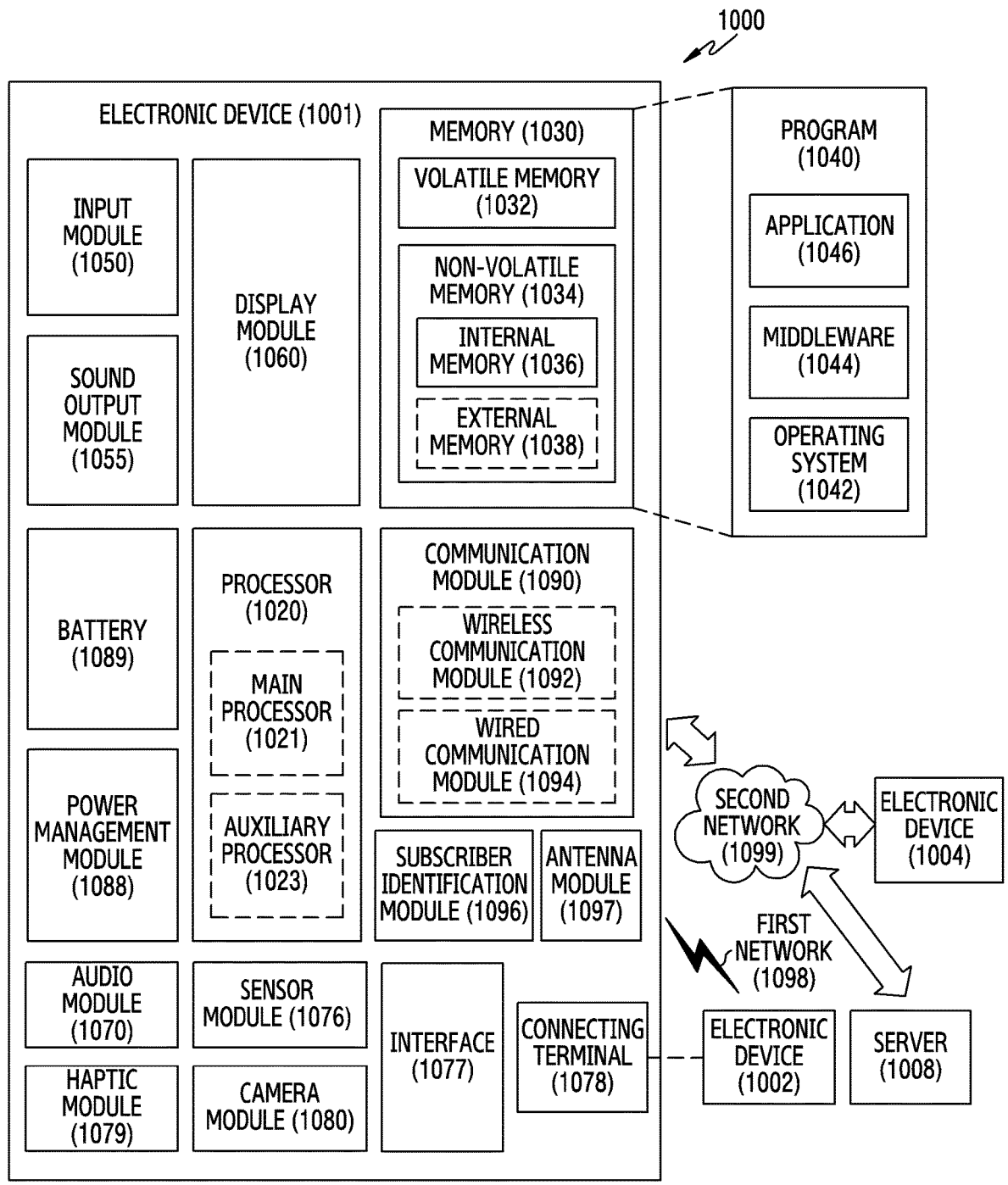
FIG. 10 is a block diagram illustrating an example electronic device in a network environment according to various embodiments.

FIG. 10 is a block diagram illustrating an example electronic device in a network environment according to various embodiments.

Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In various embodiments, at least one of the components (e.g., the connecting terminal 1078) may be omitted from the electronic device 1001, or one or more other components may be added in the electronic device 1001. In various embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to an embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to an embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™ wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element including a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In an embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various example embodiments, an electronic device may include: a camera sensor, a display panel including a first area corresponding to an area in which the camera sensor is disposed, and a second area different from the first area, and a display driver IC (DDI) configured to drive the display panel, wherein the DDI is configured to: obtain at least one of a luminance value or a gradation value of a first image output to the first area, determine whether to control the first image output to the first area, based on at least one of the luminance value or the gradation value of the first image, and control the first image output to the first area in response to the determination, wherein the first image is controlled such that, based on at least one of the luminance value of the first image or the gradation value of the first image, a plurality of pixels disposed in the first area are powered off, or a third image different from the first image is output to the first area.

According to an example embodiment, the third image may include at least one of an all-black image indicating the camera sensor disposed in the area corresponding to the first area or an image configured based on an input.

According to an example embodiment, based on the first image output to the first area being controlled such that the third image different from the first image is output, the DDI may be configured to synthesize the third image with the first image output to the first area, so as to output the synthesized image to the first area.

According to an example embodiment, the DDI may be configured to control the first image output to the first area, based on the luminance value of the first image being equal to or greater than a specified value.

According to an example embodiment, the electronic device has a range of gradation divided into a high gradation section, a low gradation section, and an intermediate gradation section between the high gradation section and the low gradation section, and the DDI may be configured to control the first image output to the first area, based on the gradation value of the first image being included in the high gradation section or the low gradation section.

According to an example embodiment, the DDI may be configured to control the first image output to the first area so as to be converted into the all-black image, based on the gradation value of the first image being included in the high gradation section, and control the first image output to the first area so as to be converted into a gray image, based on the gradation value of the first image being included in the low gradation section.

According to an example embodiment, the high gradation section may include a gradation section of 242 to 255 stages, and the low gradation section may include a gradation section of 32 stages or less.

According to an example embodiment, the DDI may be configured to obtain a gradation value of a second image output to the second area which is a peripheral area of the first area, and control the first image output to the first area, based on a difference between the gradation value of the first image output to the first area and the gradation value of the second image output to the second area being greater than or equal to a threshold value.

According to an example embodiment, the electronic device has a range of gradation, divided into a high gradation section, a low gradation section, and an intermediate gradation section between the high gradation section and the low gradation section, and the DDI may be configured to control the first image output to the first area, based on the luminance value of the first image is greater than or equal to a specified value and the gradation value of the first image is included in the high gradation section or the low gradation section.

According to an example embodiment, each of the first area and the second area may include a plurality of pixels.

According to an example embodiment, the electronic device may further include a memory configured to store a plurality of applications, the first image output to the first area may include at least one of an execution screen of a first application among the plurality of applications or an execution screen of a second application different from the first application, and the DDI may be configured to control the execution screen of the first application output to the first area, based on the first application being executed, and output the execution screen of the second application to the first area, based on the second application being executed.

According to an example embodiment, the first application may include at least one of an application for executing a front camera, a web browser application, a document writing application, or an e-book application, and the second application may include at least one of a video playback application, a gallery application, an application for executing a rear camera, or a game application.

According to various example embodiments, a method of controlling an electronic device including a display panel including a first area corresponding to an area in which a camera sensor is disposed, and a second area different from the first area may include: obtaining at least one of a luminance value of a first image output to the first area or a gradation value of the first image, determining whether to control the first image output to the first area based on at least one of the luminance value of the first image or the gradation value of the first image, and controlling the first image output to the first area in response to the determination, wherein the first image is controlled such that, based on at least one of the luminance value of the first image or the gradation value of the first image, a plurality of pixels disposed in the first area are powered off, or a third image different from the first image is output to the first area.

According to an example embodiment, the method may include, based on the first image being controlled such that the third image different from the first image output to the first area is output, synthesizing the third image with the first image output to the first area, to output the synthesized image to the first area.

According to an example embodiment, the method may include controlling the first image output to the first area based on the luminance value of the first image being equal to or greater than a specified value.

According to an example embodiment, the method may include controlling the first image output to the first area based on the gradation value of the first image being included in a high gradation section or a low gradation section.

According to various example embodiments, an electronic device may include: a camera sensor, a display panel including a first area corresponding to an area in which the camera sensor is disposed, and a second area different from the first area, a display driver IC (DDI) configured to drive the display panel, and a processor electrically connected to the camera sensor, the display panel, and the DDI, wherein the processor is configured to: obtain at least one of a luminance value of a first image output to the first area and a gradation value of the first image through the DDI, determine whether to control the first image output to the first area, based on at least one of the luminance value of the first image and the gradation value of the first image, and control the first image output to the first area through the DDI in response to the determination, and the first image is controlled such that, based on at least one of the luminance value of the first image or the gradation value of the first image, a plurality of pixels disposed in the first area are powered off, or a third image different from the first image is output to the first area.

According to an example embodiment, the third image may include at least one of an all-black image indicating the camera sensor disposed in the area corresponding to the first area or an image configured based on an input.

According to an example embodiment, based on a control signal for outputting the third image different from the first image being received from the processor, the DDI may be configured to synthesize the third image with the first image output to the first area, to output the synthesized image to the first area.

According to an example embodiment, based on the luminance value of the first image being equal to or greater than a specified value, the processor may be configured to transmit, to the DDI, a signal for controlling the first image output to the first area.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a camera sensor;
a display panel comprising a first area corresponding to an area in which the camera sensor is disposed, and a second area different from the first area, wherein the second area includes a peripheral area of the first area surrounding the first area; and
a display driver IC (DDI) configured to drive the display panel,
wherein the DDI is configured to:
obtain at least one of a luminance value or a gradation value of a first image output to the first area,
determine whether to control the first image output to the first area based on at least one of the luminance value or the gradation value of the first image, and
control the first image output to the first area in response to the determination, wherein
the first image is controlled such that, based on at least one of the luminance value of the first image or the gradation value of the first image, a plurality of pixels disposed in the first area are powered off, or a third image different from the first image is output to the first area.

2. The electronic device of claim 1, wherein the third image comprises at least one of an all-black image indicating the camera sensor disposed in the area corresponding to the first area or an image configured based on an input.

3. The electronic device of claim 1, wherein based on the first image output to the first area being controlled such that the third image different from the first image is output, the DDI is configured to synthesize the third image with the first image output to the first area, to output the synthesized image to the first area.

4. The electronic device of claim 1, wherein the DDI is configured to control the first image output to the first area, based on the luminance value of the first image being greater than or equal to a specified value.

5. The electronic device of claim 1, wherein the electronic device has a range of gradation divided into a high gradation section, a low gradation section, and an intermediate gradation section between the high gradation section and the low gradation section, and
the DDI is configured to control the first image output to the first area, based on the gradation value of the first image being included in the high gradation section or the low gradation section.

6. The electronic device of claim 5, wherein the DDI is configured to:
based on the gradation value of the first image being included in the high gradation section, control the first image output to the first area to be converted into an all-black image, and
based on the gradation value of the first image being included in the low gradation section, control the first image output to the first area to be converted into a gray image.

7. The electronic device of claim 5, wherein the high gradation section comprises a gradation section of 242 to 255 stages, and the low gradation section comprises a gradation section of 32 stages or less.

8. The electronic device of claim 1, wherein the DDI is configured to:
obtain a gradation value of a second image output to the second area, the second area being a peripheral area of the first area, and
based on a difference between the gradation value of the first image output to the first area and the gradation value of the second image output to the second area being greater than or equal to a threshold value, control the first image output to the first area.

9. The electronic device of claim 1, wherein the electronic device has a range of gradation, divided into a high gradation section, a low gradation section, and an intermediate gradation section between the high gradation section and the low gradation section, and
the DDI is configured to control the first image output to the first area, based on the luminance value of the first image being greater than or equal to a specified value and the gradation value of the first image is included in the high gradation section or the low gradation section.

10. The electronic device of claim 1, wherein each of the first area and the second area comprises a plurality of pixels.

11. The electronic device of claim 1, further comprising a memory configured to store a plurality of applications,
wherein the first image output to the first area comprises at least one of an execution screen of a first application among the plurality of applications or an execution screen of a second application different from the first application, and
the DDI is configured to:
based on the first application being executed, control the execution screen of the first application output to the first area, and
based on the second application being executed, output the execution screen of the second application to the first area.

12. The electronic device of claim 11, wherein the first application comprises at least one of a web browser application, a document writing application, or an e-book application, and
the second application comprises at least one of a video playback application, a gallery application, a camera application, or a game application.

13. A method of operating an electronic device comprising a display panel comprising a first area corresponding to an area in which a camera sensor is disposed and a second area different from the first area, wherein the second area includes a peripheral area of the first area surrounding the first area, the method comprising:
obtaining at least one of a luminance value of a first image output to the first area or a gradation value of the first image;
determining whether to control the first image output to the first area, based on at least one of the luminance value of the first image or the gradation value of the first image; and
controlling the first image output to the first area, in response to the determination,
wherein the first image is controlled such that, based on at least one of the luminance value of the first image or the gradation value of the first image, a plurality of pixels disposed in the first area are powered off, or a third image different from the first image is output to the first area.

14. The method of claim 13, comprising
based on the first image being controlled such that the third image different from the first image output to the first area is output, synthesizing the third image with the first image output to the first area, to output the synthesized image to the first area.

15. The method of claim 13, comprising
based on the luminance value of the first image being greater than or equal to a specified value, controlling the first image output to the first area.

16. The method of claim 13, comprising
based on the gradation value of the first image being included in a high gradation section or a low gradation section, controlling the first image output to the first area.

17. An electronic device comprising:
a camera sensor;
a display panel comprising a first area corresponding to an area in which the camera sensor is disposed, and a second area different from the first area, wherein the second area includes a peripheral area of the first area surrounding the first area;
a display driver IC (DDI) configured to drive the display panel;
at least one processor; and
memory,
wherein the memory stores instructions that, when executed by the at least one processor, cause the electronic device to:
obtain at least one of a luminance value of a first image output to the first area and a gradation value of the first image through the DDI,
determine whether to control the first image output to the first area, based on at least one of the luminance value of the first image and the gradation value of the first image, and
control the first image output to the first area through the DDI in response to the determination, wherein the first image is controlled such that, based on at least one of the luminance value of the first image or the gradation value of the first image, a plurality of pixels disposed in the first area are powered off, or a third image different from the first image is output to the first area.

18. The electronic device of claim 17, wherein the third image comprises at least one of an all-black image indicating the camera sensor disposed in the area corresponding to the first area or an image configured based on an input.

19. The electronic device of claim 17, wherein the instructions that, when executed by the at least one processor, cause the electronic device to, based on a control signal for outputting the third image different from the first image, synthesize the third image with the first image output to the first area, to output the synthesized image to the first area.

20. The electronic device of claim 17, wherein the instructions that, when executed by the at least one processor, cause the electronic device to, based on the luminance value of the first image being greater than or equal to a specified value, transmit, to the DDI, a signal for controlling the first image output to the first area.

* * * * *